United States Patent
Seurujarvi

(10) Patent No.: US 6,171,039 B1
(45) Date of Patent: Jan. 9, 2001

(54) LOCKING MECHANISM FOR CONNECTOR

(75) Inventor: Pekka Seurujarvi, Irving, TX (US)

(73) Assignee: Nokia Telecommunications Oy, Espoo (FI)

( * ) Notice: Under 35 U.S.C. 154(b), the term of this patent shall be extended for 0 days.

(21) Appl. No.: 09/309,337

(22) Filed: May 11, 1999

(51) Int. Cl.[7] ..................................................... F16B 39/24
(52) U.S. Cl. .......................... 411/148; 411/155; 411/200; 411/522
(58) Field of Search ..................................... 411/104, 147, 411/148, 155, 156, 197, 198, 199, 200, 221, 222, 232, 234, 315, 316, 522, 523

(56) References Cited

U.S. PATENT DOCUMENTS

| | | | |
|---|---|---|---|
| 824,382 | * | 6/1906 | Quitman ................................ 411/147 |
| 995,169 | * | 6/1911 | Murdock ............................... 411/200 |
| 1,038,528 | * | 9/1912 | Cookerley . | |
| 1,201,501 | * | 10/1916 | Rice . | |
| 1,562,691 | * | 11/1925 | De Graaf ............................. 411/148 |
| 3,297,916 | * | 1/1967 | Wright .................................. 411/522 |
| 4,352,583 | * | 10/1982 | Errichiello . | |
| 4,684,284 | * | 8/1987 | Bradley ................................ 411/221 |
| 4,842,485 | * | 6/1989 | Pease ................................... 411/522 |
| 5,628,599 | * | 5/1997 | Eakin ................................... 411/156 |

FOREIGN PATENT DOCUMENTS

| | | | |
|---|---|---|---|
| 121380 | * | 5/1946 | (AU) ................................... 411/522 |
| 58973 | * | 1/1912 | (CH) ................................... 411/155 |

* cited by examiner

*Primary Examiner*—Flemming Saether
(74) *Attorney, Agent, or Firm*—Jerald J. Gnuschke; Brian T. Rivers

(57) ABSTRACT

A product and method for preventing a connector from rotating when a mating connector is attached to, or detached from, the connector. When a nut on the connector is tightened, a washer is compressed in a groove in a panel to which the connector is attached. Edges on the outer perimeter of the washer press against the edges of the groove, thus preventing the washer from rotating in relation to the panel having the connector. A portion of the washer's cutout presses against flat regions on the connector and, in conjunction with the groove in the panel, prevent the connector from rotating when attaching or detaching cables.

9 Claims, 3 Drawing Sheets

LOCKING MECHANISM FOR CONNECTOR

FIELD OF THE INVENTION

This invention relates to locking mechanisms for connectors and, more particularly, to a mechanism to prevent rotation of a connector during connect and disconnect operations.

BACKGROUND OF THE INVENTION

Many connectors, such as SMA or SMC connectors, attach to mating connectors by means of threads or other means that require application of rotational force during connection and disconnection. Unless prevented in some manner, a connector will rotate due to the rotational force exerted when connecting or disconnecting mating connectors.

A persistent problem in the telecommunications industry is base station connectors that rotate when mating connectors are disconnected. These base station connectors extend through a wall (or panel) of the base station enclosure and allow an external cable to be electrically connected to the base station's internal electronics. FIG. 1, discussed below, shows a typical example of a connector 100 extending through a panel 120 of a base station. Base station connectors mate with another connector (a mating connector) that usually is attached to a coaxial cable of some sort. The base station connectors often have a soldered electrical connection on the internal side of the base station enclosure. Even a few degrees of rotation can be enough to break solder joints so it is very important to prevent the base station connector from rotating.

FIG. 1 shows a prior art method of preventing a connector 100 from rotating during connection or disconnection of mating connectors. Connector 100 has threads at one end for screwing into a threaded hole in panel 120 and at the other end for attaching a nut 110. Nut 110 is then screwed down tight against panel 120 to prevent connector 100 from rotating. This method is commonly used but does not prevent rotation very well.

FIG. 2 shows a prior art method of preventing a connector 200 from rotating during connection or disconnection of mating connectors. Connector 200 has a rectangular flange 210 with screw holes 230 in each corner. Connector 200 inserts into a hole in panel 120. It is held in place by screws inserted in each of the screw holes 230. This method works well but requires drilling and thread tapping of four additional holes. Therefore this method is expensive, difficult to manufacture, and requires extra steps to attach connector 200 to panel 120.

FIG. 3 shows a prior art method of preventing a connector 300 from rotating during connection or disconnection of mating connectors. Connector 300 has a flange 310. When connector 300 is screwed into a threaded hole in panel 120, flange 310 compresses O-ring 330 against panel 120. Under ideal conditions, O-ring 330 provides enough frictional resistance to rotation that mating connectors can be connected or disconnected without causing connector 300 to rotate. When exposed to the elements in the field, the connector oxidizes. The oxidation causes the connector to bind when joined with its mate, requiring application of greater rotational connect/disconnect force than the O-ring 330 can resist. Thus this method does not prevent rotation under commonly encountered field conditions.

Additional general background, which helps to show the knowledge of those skilled in the art regarding the system context, and of variations and options for implementations, may be found in Catalog Number 82074 version 5-98 from AMP Incorporated, all of which is hereby incorporated by reference.

SUMMARY OF THE INVENTION

A lock washer and method for preventing a connector from rotating when mating connectors are attached or detached. In the presently preferred embodiment, the disclosed connector locking mechanism incorporates an innovative lock washer that, in combination with a groove in a panel holding the connector, prevents rotation of the connector when a mating connector is twisted on or off.

In the presently preferred embodiment, a connector that is attached to a panel is prevented from rotating by the use of an innovative lock washer that fits in a groove in the panel. The lock washer has a keyhole-shaped cutout. Part of the cutout has approximately parallel edges. Another part of the cutout allows the lock washer to fit over the larger perimeter (meaning without flat regions) portion of connector. After the lock washer is on the connector, the lock washer slides so that the approximately parallel edges of the cutout are aligned over flat regions on the connector. Then a nut is screwed onto the connector, compressing the approximately parallel edges of the lock washer cutout against the flat regions on the connector. The groove in the panel prevents the lock washer (and thus the connector) from rotating during attachment/detachment of mating connectors.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
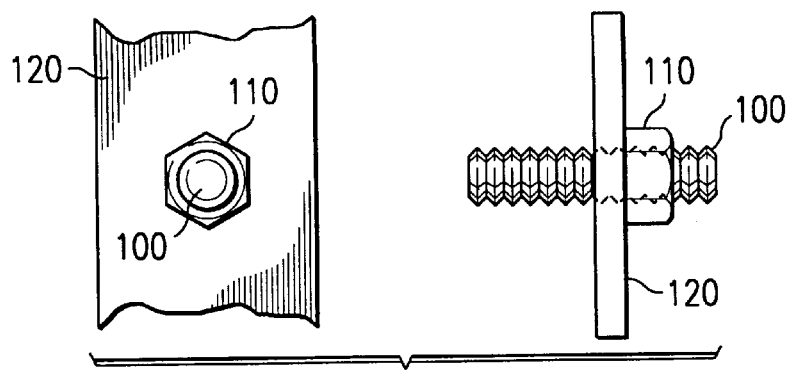
FIG. 1 depicts a prior art system for preventing connector rotation.
Figure 2:
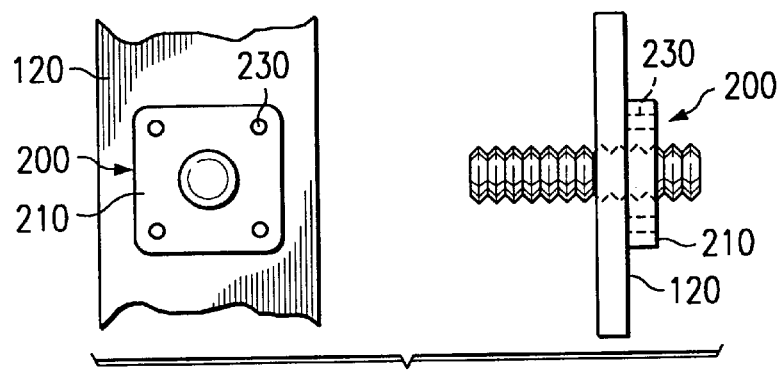
FIG. 2 depicts a prior art system for preventing connector rotation.
Figure 3:
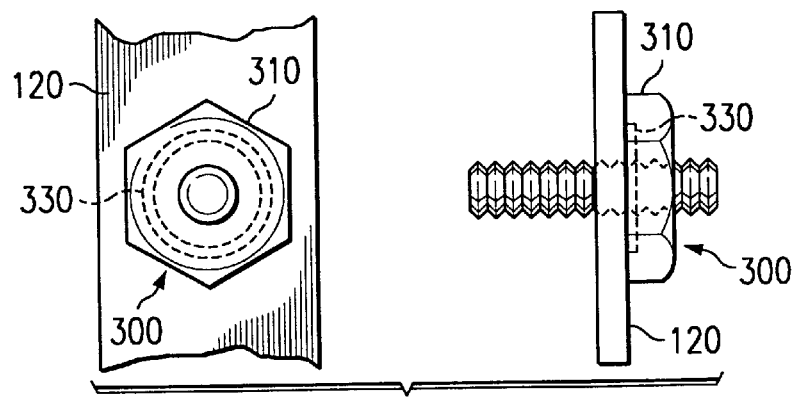
FIG. 3 depicts a prior art system for preventing connector rotation.
Figure 4:
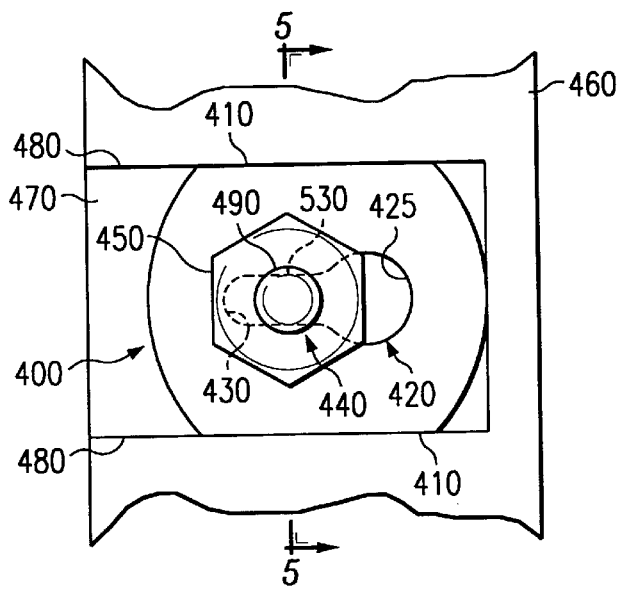
FIG. 4 depicts a top view of the presently preferred embodiment of the disclosed innovative connector system.
Figure 5:
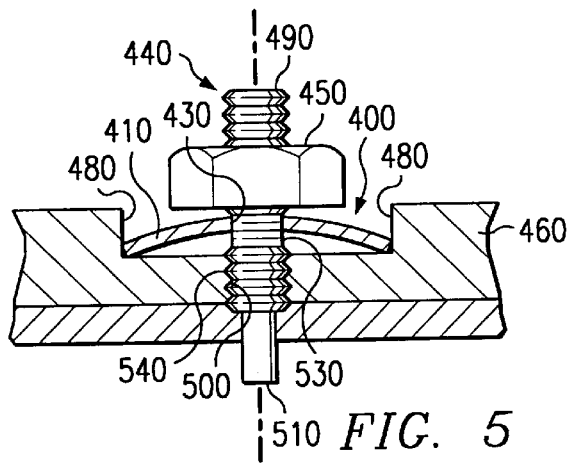
FIG. 5 depicts a cut-away side view of the presently preferred embodiment of the disclosed innovative connector system.

FIGS. 4 and 5 show a top view and cut-away side view (taken along line AA), respectively, of the presently preferred embodiment of the disclosed innovations. A first end 490 of an SMA connector 440 extends perpendicularly from a panel 460. A groove 470 is manufactured into panel 460. A washer 400 fits over the end 490 of connector 440 and into groove 470. Washer 400 has a keyhole-shaped cutout 420 with approximately parallel edges 430. A portion 425 of cutout 420 is large enough to allow washer 400 to slip over end 490 of connector 440. After washer 400 is placed on connector 440, washer 400 slides so that the approximately parallel edges 430 of the keyhole-shaped cutout 420 are aligned with flat regions 530 on connector 440. Note that FIG. 4 shows the "post-slide" alignment in which approximately parallel edges 430 align with flat regions 530. After washer 400 is in place, a nut 450 screws onto connector 440. As nut 450 presses against washer 400, the approximately parallel edges 430 are forced closer together by the deformation of washer 400. Thus approximately parallel edges 430 of cutout 420 are compressed tightly against flat regions 530 of connector 440.

Threads 500 at end 540 hold connector 400 to panel 460. A wire or cable (not shown) is connected at solder connection pin 510. Washer 400 fits into groove 470. Edges 480 of groove 470 restrict movement of washer 400. As nut 450 is tightened onto connector 440, the approximately parallel sides 430 of cutout 420 in washer 400 are compressed against the flat regions 530 of connector 440 and the outer perimeter of washer 400 is compressed against edges 480 of groove 470. In the presently preferred embodiment, the concave shape of washer 400 helps push approximately parallel sides 430 of cutout 420 tight against flat regions 530 of connector 440. The concave shape also helps push the outer perimeter of washer 400 against edges 480 of groove 470. Thus the concave shape has advantages over a flat shape: the edges of the cutout can be tightened against the flat regions on the connector and the washer perimeter can be tightened against edges of the groove. These advantages lead to a further advantage: increased tolerance for dimensional variations in manufacturing. A flat washer must precisely match the dimensions of the connector and the groove because a solder connection has very small tolerance for rotation. This would require that a flat washer be custom manufactured to match a particular connector and groove, an economically unfeasible alternative. A concave washer avoids this problem due to its spring-like properties.

Figure 6A:
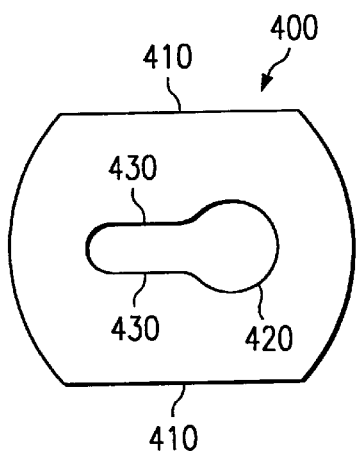
FIG. 6A depicts a top view of the presently preferred embodiment of the disclosed innovative lock washer.

FIG. 6A shows a top view of the presently preferred embodiment of washer 400. Approximately parallel flat edges 410 are on the outer perimeter of washer 400. A keyhole shaped cutout 420, having approximately parallel edges 430, is disposed within the outer perimeter of washer 400. Cutout 420 also a portion 425 that allows the washer to slip over end 490 of connector 440.

Figure 6B:
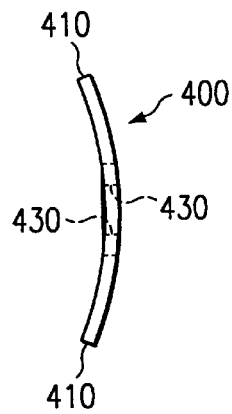
FIG. 6B depicts a side view of the presently preferred embodiment of the closed innovative lock washer.

FIG. 6B shows a side view of the presently preferred embodiment of washer 400. Due to the concave surface, the distance between the approximately parallel edges 430 will decrease when the washer is compressed. Rotation is prevented because movement of outer perimeter edges 410 is restricted (by edges 480 of groove 470 as shown in FIG. 4).

Figure 7A:
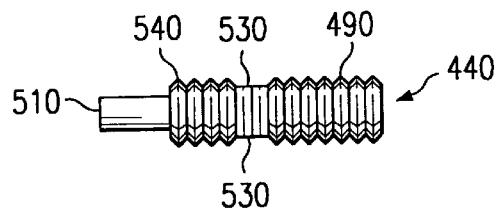
FIG. 7A depicts a side view of a connector having flat regions.
Figure 7B:
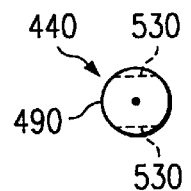
FIG. 7B depicts an end view of a connector having flat regions.
Figure 7C:
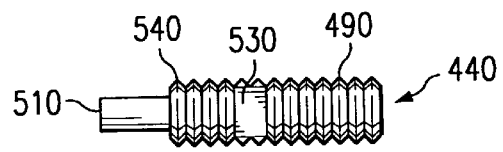
FIG. 7C depicts top view of a connector having flat regions.

For clarity, FIGS. 7A–C show a side view, end view, and top view of connector 440, respectively. Flat regions 530 can more easily be seen in FIGS. 7A–C than in FIGS. 4 and 5. FIG. 7B shows an end view from end 490.

Figure 8A:
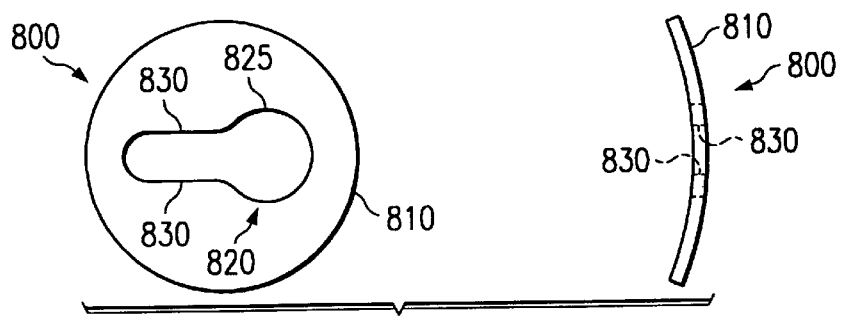
FIG. 8A shows an alternate shape for the disclosed lock washer.

FIG. 8A shows an alternative washer embodiment. Washer 800 is similar to washer 400 except that the outer perimeter 810 is circular and does not have flat edges. As in the presently preferred embodiment, a keyhole-shaped cutout 820 with approximately parallel edges 830 (and a portion 825 for slipping over an end of a connector) is disposed within the outer perimeter of washer 800.

Figure 8B:
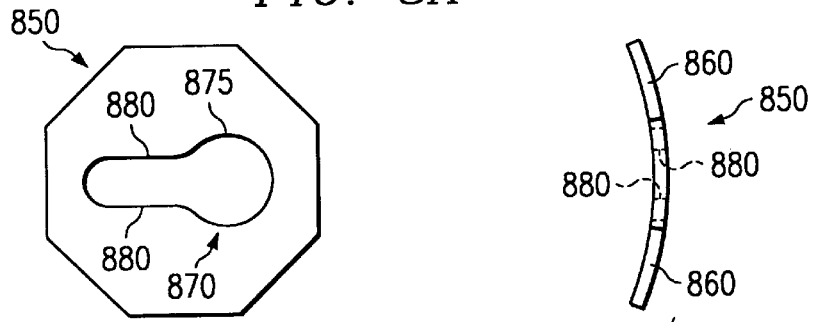
FIG. 8B shows an alternate shape for the disclosed lock washer.

FIG. 8B shows an alternative washer embodiment. Washer 850 is similar to washer 400 except that it is octagonal. As in the presently preferred embodiment, a keyhole-shaped cutout 870 with approximately parallel edges 880 (and a portion 875 for slipping over an end of a connector) is disposed within the outer perimeter of washer 800.

Figure 8C:
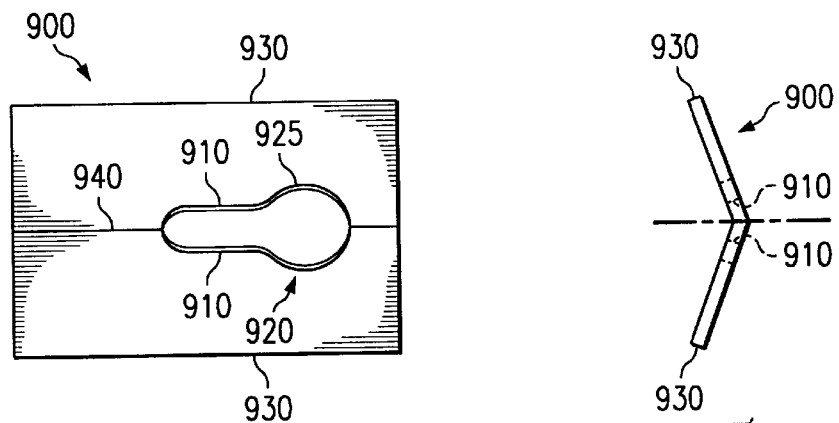
FIG. 8C shows an alternate shape for the disclosed lock washer.

FIG. 8C shows an alternative washer embodiment. Washer 900 is rectangular in shape and is folded along the centerline. A keyhole-shaped cutout 920 has approximately parallel edges 910 and a portion 925 for slipping over an end of a connector. The keyhole-shaped cutout 920 is disposed along the centerline 940. When concave washer 900 is compressed, edges 930 are forced against edges of a groove on a panel.

Figure 8D:
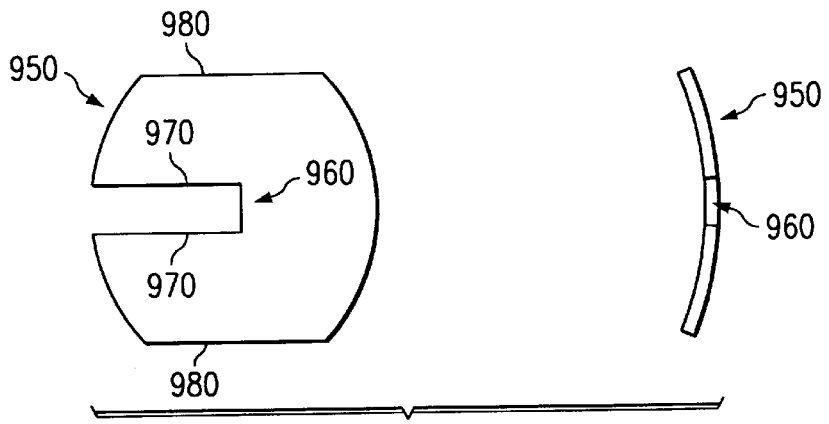
FIG. 8D shows an alternate shape for the disclosed lock washer.

FIG. 8D shows an alternative washer embodiment. The outer perimeter of washer 950 has flat edges 980 similar to the presently preferred embodiment. A slot-shaped cutout 960 has approximately parallel edges 970. Unlike the cutouts of the previously disclosed embodiments, the slot-shaped cutout 960 opens to the outside perimeter. This allows washer 950 to be placed onto flat regions (such as regions 530 shown in FIG. 7A) on a connector without having to fit over the end of the connector. When concave washer 950 is compressed, edges 980 are forced against edges of a groove on a panel.

As will be recognized by those skilled in the art, the innovative concepts described in the present application can be modified and varied over a tremendous range of applications, and accordingly the scope of patented subject matter is not limited by any of the specific exemplary teachings given.

For example, the washer cutout could be any suitable shape and is not limited to a keyhole shape.

As another example, the washer shown in FIG. 8B could have another polygonal shape with more or fewer flat edges on the outer perimeter.

As another example, the washer 400 does not have to be concave. It may be flat, although more precise machining is required when using a flat washer.

As another example, connector 440 could extend from panel 460 at any suitable angle, not just perpendicularly.

As another example, the groove in the panel could be any suitable structure for preventing the lock washer from rotating, including grooves with different geometries than those disclosed above. A suitable structure may include two smaller parallel grooves into which only the edges of the concave washer fit. Another suitable structure may be a groove that is approximately the same size as the washer, such that the approximately parallel edges of the cutout must be aligned with the flat regions of the connector before the washer fits into the groove. Another suitable structure may be raised ridges (instead of a groove) that prevent the lock washer from rotating.

As another example, the parallel edges of the cutout do not have to be parallel. Any suitable geometry that will grip a flat region of the connector can be used. A suitable geometry of cutout may have sawtooth-like edges. Another suitable geometry may only use one flat edge in the cutout to mate with a flat region on the connector.

What is claimed is:

1. A connector system, comprising:

a connector, said connector having two flat regions;

a washer, said washer further comprising a cutout for insertion of said connector, said cutout having a first portion for gripping said two flat regions on said connector;

a nut for securing said first portion of said cutout against said two flat regions;

a panel having an opening for accepting said connector;

wherein said panel restricts movement of said washer; said panel further comprising a groove for accepting said washer, wherein edges of said groove contact an outer perimeter of said washer when said washer is secured by said nut, thereby preventing rotation of said washer.

2. A connector system, comprising:

a connector, said connector having two flat regions;

a washer, said washer further comprising a cutout for insertion of said connector, said cutout having a first portion for gripping said two flat regions on said connector;

a nut for securing said first portion of said cutout against said two flat regions;

a panel having an opening for accepting said connector;

wherein said panel restricts movement of said washer; said panel further comprising ridges for accepting said washer, wherein said ridges contact an outer perimeter of said washer when said washer is secured by said nut, thereby preventing rotation of said washer.

3. A telecommunications base station, comprising:

a connector system, said system having a washer, said washer further comprising a cutout for insertion of a connector, said cutout having a first portion for gripping a flat region on said connector, and a nut, for compressing said washer; and a base station enclosure, an outer surface of said enclosure having a structure for restricting movement of said washer;

said structure comprising a groove in said outer surface of said base station.

4. A telecommunications base station, comprising:

a connector system, said system having a washer, said washer further comprising a cutout for insertion of a connector, said cutout having a first portion for gripping a flat region on said connector; and a nut, for compressing said washer, and a base station enclosure, an outer surface of said enclosure having a structure for restricting movement of said washer;

said structure comprising a ridge on said outer surface of said base station.

5. A method of preventing a connector from rotating, comprising the steps of:

placing a washer on a connector attached to a panel, said washer having a cutout with a portion for gripping a flat region on said connector; and tightening a nut against said washer;

compressing said portion of said cutout against said flat region on said connector; and compressing an outer perimeter of said washer against a feature of said panel;

thereby preventing said connector from rotating.

6. The method of claim 5, wherein said washer is concave.

7. The method of claim 5, wherein said feature is a groove.

8. The method of claim 5, wherein said feature is a ridge.

9. The method of claim 5, wherein said cutout is keyhole-shaped.

* * * * *